United States Patent [19]

Flanigen et al.

[11] 4,241,036
[45] Dec. 23, 1980

[54] SYNTHETIC CRYSTALLINE ZEOLITE AND PROCESS FOR PREPARING SAME

[75] Inventors: Edith Flanigen, White Plains, N.Y.; Elsa R. Kellberg, Vienna, Va.

[73] Assignee: Union Carbide Corporation, New York, N.Y.

[21] Appl. No.: 625,091

[22] Filed: Oct. 23, 1975

Related U.S. Application Data

[63] Continuation-in-part of Ser. No. 655,318, Jul. 24, 1967, abandoned, which is a continuation-in-part of Ser. No. 569,805, Aug. 3, 1966, abandoned.

[51] Int. Cl.² ............................................. C01B 33/28
[52] U.S. Cl. .............................. 423/328; 252/455 Z; 260/448 C; 423/329
[58] Field of Search ....................... 423/328, 329, 330; 260/448 C; 253/455 Z

[56] References Cited

U.S. PATENT DOCUMENTS

| 3,306,922 | 2/1967 | Barrer et al. | 260/448 C |
| 3,314,752 | 4/1967 | Kerr | 423/328 |
| 3,375,205 | 3/1968 | Wadlinger et al. | 423/328 X |
| 3,923,639 | 12/1975 | Ciric | 208/111 |

FOREIGN PATENT DOCUMENTS 6616499  5/1967  Netherlands ............................. 423/328

Primary Examiner—Edward J. Meros
Attorney, Agent, or Firm—Richard G. Miller

[57] ABSTRACT

A new three-dimensional crystalline zeolite having unique adsorptive properties is prepared hydrothermally from a reaction gel containing tetramethylammonium hydroxide in addition to a source of silica and alumina and sodium hydroxide. The zeolite as crystallized from the reaction system contains tetramethylammonium cations in addition to sodium cations. The zeolite is denominated zeolite $\Omega$.

6 Claims, No Drawings

SYNTHETIC CRYSTALLINE ZEOLITE AND PROCESS FOR PREPARING SAME

RELATED APPLICATIONS

This application is a continuation-in-part of application, Ser. No. 655,318, filed July 24, 1967, now abandoned, which was in turn a continuation-in-part of application, Ser. No. 569,805, filed Aug. 3, 1966 and now abandoned.

The present invention relates in general to novel synthetic crystalline zeolitic molecular sieves and to the method for preparing same. More particularly the invention relates to a novel crystalline zeolite characterized by outstanding thermal, steam and acid stability and the ability to adsorb molecules of large dimensions.

The so-called framework aluminosilicates include feldspars, felspathoids and zeolites, all of which have structures consisting of three-dimensional arrangements of $SiO_4$ and $AlO_4$ tetrahedra. The crystal structures of many zeolites also exhibit interstices of molecular dimensions occupied by water of hydration. Under proper conditions of dehydration, these zeolites may be utilized as efficient adsorbents whereby adsorbate molecules are retained within the interstitial spaces. Access to these channels is had by way of orifices in the crystal lattice. The openings limit the size and shape of the molecules that can be adsorbed. A separation of mixtures of molecules based upon molecular dimensions, wherein certain molecules are adsorbed by the zeolite while others are refused, is therefore possible. It is this characteristic property of many crystalline zeolites that has led to their designation as "molecular sieves." In addition to molecular size and shape, however, other factors may also influence the selective adsorption of certain foreign molecules by molecular sieves. Among these factors are: the polarizability and polarity of the adsorbate molecules; the degree of unsaturation of organic adsorbates; the size and polarizing power of the interstitial cation; the presence of adsorbate molecules in the interstitial spaces; and the degree of hydration of the zeolite.

In addition to the unique adsorption properties of zeolitic molecular sieves, certain of these materials, particularly when chemically modified, are excellent catalysts in hydrocarbon conversion processes such as reforming, cracking, isomerization, dehydrogenation, and the like. The mechanisms involved in catalysis, however, are quite complex, and consequently the precise chemical properties of the zeolites which contribute to a particular catalytic activity are not fully understood.

Over the past few years about 40 species of synthetic crystalline zeolites have been prepared. They are distinguishable from each other and from the naturally occurring zeolites on the basis of such factors as composition, crystal structure, adsorption properties, and their X-ray powder diffraction patterns. The existence of a number of zeolites having similar but distinguishable properties advantageously permits the selection of a particular member having optimum properties for a particular use.

The present invention has as its principal object the provision of a novel synthetic crystalline zeolite of the molecular sieve type. Another object is to provide a novel synthetic crystalline zeolite having useful adsorption properties. A further object is to provide convenient and efficient processes for preparing the novel zeolites of the invention. The synthetic zeolitic molecular sieve compositions of the present invention are hereinafter designated zeolite $\Omega$ ("omega").

The composition of zeolite $\Omega$ can be expressed stoichiometrically in terms of moles of oxides as follows:

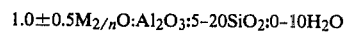

wherein M represents at least one cation having a valence "n", preferably a valence of 1 to 3 inclusive. The cations represented by M include non-metallic cations such as hydrogen, ammonium, and organic cations of the alkylonium type, particularly alkylammonium cations of the structure $R'_{(4-q)} H_q N^+$ wherein "q" has a value of from 0 to 3 inclusive and R' is an alkyl group, preferably methyl or ethyl, and also M can represent metal cations such as alkali metals, particularly sodium, alkaline earth metals, transition metals and rare earth elements of the lanthanide series. The transition metals are those having atomic numbers from 21 through 29, from 39 through 46 and from 72 through 78. The lanthanide or rare earth series comprises elements having atomic numbers from 57 through 71.

In a preferred embodiment, the composition of zeolite $\Omega$ in terms of moles of oxides is:

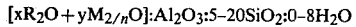

wherein R represents hydrogen, ammonium, alkylammonium or mixtures thereof, "x" has a value of from 0 to 0.7, "M" represents a metal cation as defined hereinabove having a valence of "n", and the sum of x and y is from 0.5 to 1.5. A particularly preferred composition is

wherein x, y and x+y are as defined hereinabove, and $Me = CH_3$. This preferred embodiment is designated "zeolite TMA-$\Omega$."

In addition to composition and in conjunction therewith, zeolite $\Omega$ can be identified and distinguished from other crystalline substances by its X-ray powder diffraction pattern, the data for which are set forth below in Table A. In obtaining the X-ray powder diffraction pattern, standard techniques were employed. The radiation was the $K_\alpha$ doublet of copper, and a Geiger counter spectrometer with a strip chart pen recorder was used. The peak heights, I, and the positions as a function of $2\phi$, where $\phi$ is the Bragg angle, were read from the spectrometer chart. From these, the relative intensities, and $d(Å)$ observed, the interplanar spacing in Angstrom units corresponding to the recorded lines, were determined. In Table A, the more significant interplanar spacings, i.e., the $d(Å)$ values which characterize and distinguish zeolite $\Omega$ from other zeolite species and which must be present in the X-ray powder diffraction pattern of zeolite $\Omega$ are set forth. The relative intensities of the lines are expressed as VS (very strong), S (strong), MS (medium strong) and M (medium).

TABLE A

|  | Relative Intensity |
| --- | --- |
| 15.8 ± 0.4 | M |
| 9.1 ± 0.2 | VS |
| 7.9 ± 0.2 | M |
| 6.9 ± 0.2 | M |
| 5.95 ± 0.1 | M |
| 4.69 ± 0.1 | M |
| 3.79 ± 0.1 | S |

TABLE A-continued

| | Relative Intensity |
|---|---|
| 3.62 ± 0.05 | M |
| 3.51 ± 0.05 | M-MS |
| 3.14 ± 0.05 | MS |
| 3.08 ± 0.05 | M |
| 3.03 ± 0.05 | M |
| 2.92 ± 0.05 | MS |

Thus zeolite Ω can be defined as a synthetic crystalline aluminosilicate having an X-ray powder diffraction pattern characterized by at least those interplanar spacing values set forth in Table A and having the stoichiometric compositions as set forth hereinbefore. The X-ray data given below in Table C are for a typical example of zeolite TMA-Ω as prepared in Example I infra.

The particular X-ray technique and/or apparatus employed, the humidity, the temperature, the orientation of the powder crystals and other variables, all of which are well known and understood by those skilled in the art of X-ray crystallography or diffraction, may cause some variation in the intensities and positions of the X-ray lines. Thus, the X-ray data given herein to identify zeolite Ω compositions are not intended to exclude those materials which, due to some variable mentioned above or otherwise known to those skilled in the art, do not show all of the tabulated X-ray lines, or show additional ones permissible to the crystal system of the zeolite, or show a slight change in intensity, or a shift in position of some of the X-ray lines as set forth in Table A. The characteristic X-ray pattern of Table A is equally applicable to the ion-exchanged forms of Ω such as those containing calcium, potassium, lanthanum and ammonium cations.

In a preferred embodiment of the invention, zeolite TMA-Ω is readily prepared by digesting and crystallizing an aqueous mixture whose overall compostion, expressed in terms of mole ratios of oxides, falls within the range of:

| | |
|---|---|
| $\frac{Na_2O + (Me_4N)_2O}{SiO_2}$ | from about 0.1 to about 0.6 |
| $\frac{(Me_4N)_2O}{(Me_4N)_2O + Na_2O}$ | from > 0 to about 0.6 |
| $SiO_2/Al_2O_3$ | from about 5 to about 30 |
| $\frac{H_2O}{(Me_4N)_2O + Na_2O}$ | from about 10 to about 125 | where Me=$CH_3$.

A particularly preferred set of initial reactant compositions, for producing zeolite TMA-Ω, again expressed in terms of mole ratios of oxides, is as follows:

| | |
|---|---|
| $\frac{Na_2O + (Me_4N)_2O}{SiO_2}$ | from about 0.2 to about 0.4 |
| $\frac{(Me_4N)_2O}{(Me_4N)_2O + Na_2O}$ | from > 0 to about 0.2 |
| $SiO_2/Al_2O_3$ | from about 6 to about 10 |
| $\frac{H_2O}{(Me_4H)_2O + Na_2O}$ | from about 15 to about 60. |

Representative reactants are silica gel, silicic acid, colloidal silica, alkali metal silicate, and reactive amorphous solid silicas as the source of silicon, and activated alumina, gamma alumina, alumina trihydrate or alkali metal aluminate as the source of aluminum. Sodium hydroxide and tetramethylammonium hydroxide or halide are typical convenient sources of sodium and tetramethylammonium ions, respectively. Preferred sources of silica are the reactive solid silicas which include materials known commercially as "Hi-Sil," "Cab-O-Sil," "Zeosyl," "QUSO," "Arc Silica," and the aqueous colloidal silica sols which include such materials as "Nalcoag," "Ludox," "Syton" and "Mertone."

The reaction system is formed by placing all the required reactants in the proportions hereinbefore defined in a reaction vessel and bringing the temperature of the system thus formed to a temperature of between about 20° C. and 210° C., preferably between about 80° C. and about 210° C. An initial aging of the reaction system at ambient room temperatures can be utilized if desired. Products of the highest purity have been obtained using temperatures of from about 90° C. to about 180° C., and are therefore preferred. Crystallization periods of from about 1 to 8 days at 80°–100° C. have been found satisfactory.

After the reaction period, the zeolite crystals are filtered off. The filtrate, or mother liquor, may be reused after enrichment with the proper amounts of reactants to give a properly proportioned reactant mixture. The mass of zeolite crystals is washed, preferably with distilled water and conveniently on the filter, until the effluent wash water in equilibrium with the zeolite has a pH of between 9 and 12.

Thereafter, the crystals are dried, conveniently in a vented oven, at a temperature of between about 25° C. and 150° C. For X-ray and chemical analysis, this drying is sufficient. In practical use, there need be no separate drying step since the zeolite is dehydrated in the activation step.

As synthesized, the zeolite Ω crystals are usually quite small and are recovered from the mother liquor as anhedral to spherical growth agglomerates from about 0.2 to several microns in size. The small ultimate crystalline size is evidenced by some broadening of the X-ray powder diffraction lines.

For use as an adsorbent, zeolite Ω is activated by heating the crystals at temperatures of from about 205° C. to about 500° C., either in air at atmospheric pressure or under vacuum conditions. When heated for 17 hours at temperatures within the range of about 300° C. to 750° C., the zeolite undergoes no appreciable loss in X-ray crystallinity, but at temperatures above about 400° C. there is appreciable loss of the tetramethylammonium cation content due to thermal decomposition of this cation. At about 800° C. zeolite Ω composes into an amorphous phase.

The acid stability of the zeolite Ω has been found to be quite high. When a sample of the zeolite is titrated with an 0.25 N aqueous solution of hydrochloric acid, a buffering effect is observed at a pH value of about 1.6. The pH value at which a zeolite buffers under constant acid conditions is an indication of its relative acid stability, that is, the lower pH of the buffering region, the greater the acid stability. A comparison of the pH of the buffering region for zeolite Ω and other natural and synthetic zeolites shows that zeolite Ω exhibits a stability toward acid intermediate between mordenite and zeolite Y, disclosed in U.S. Pat. No. 3,130,007 to D. W. Breck, and is comparable to the siliceous natural zeolites erionite, chabazite and clinoptilolite. The data are as follows:

| Zeolite | Molar SiO$_2$/Al$_2$O$_3$ | pH of Buffering Region | |
|---|---|---|---|
| Type Y | 5 | 2.5 | ↓ |
| Heulandite | 8 | 2.0 | ↓ |
| Zeolite Ω | 5–20 | 1.6 | ↓ Increasing |
| Erionite | 7–8 | 1.6 | ↓ acid |
| Chabazite | 7–8 | 1.5–2.0 | ↓ stability |
| Clinoptilolite | ~9 | 1.5–2.0 | ↓ |
| Mordenite | ~10 | 1.0–1.5 | ↓ |

In addition, X-ray powder diffraction data show no loss in X-ray crystallinity of the Ω zeolite after remaining in contact with an HCL solution at pH 1.6 for 18 hours at room temperatures.

As with most crystalline zeolites of the molecular sieve type, zeolite Ω can be ion-exchanged to produce a composition of the same crystalline structure but containing cations other than those present in the reaction system from which it was formed. It was found, however, that despite the fact that the pore size of the zeolite is at least about 11 Å and is thus capable of diffusing tetramethylammonium ions therethrough based on considerations of ion size, the tetramethylammonium ions incorporated during synthesis of zeolite TMA-Ω are not exchangeable by ions such as sodium, potassium or calcium and can be removed only by thermal decomposition. It is therefore believed the tetramethylammonium ions are present in "cages" within the structure which are smaller than those which control the pore size. It is believed zeolite Ω is not only a distinct species of zeolitic molecular sieve but also is a member of a new structural class of zeolites exhibiting a unique and heretofore unknown framework arrangement of [(Si, Al)O$_2$] tetrahedra.

The alkali metal cations present in zeolite Ω as formed can be exchanged by other cation species to a considerable degree. Using 1M aqueous solutions respectively of CaCl$_2$, KCl, NH$_4$Cl and LaCl$_3$ for example, it was found that a degree of exchange of 0.51 (Ca), 0.70 (K$_2$), 0.64 [(NH$_4$)$_2$] and 0.45 (La) per Al$_2$O$_3$ was readily attained. Ion exchange to the Ca, K or NH$_4$ form of zeolite Ω does not significantly affect the adsorption pore size and causes only a minor variation in adsorption capacity. The K-exchanged form appears to have a slightly higher capacity than the other ion-exchanged forms examined. The tetramethylammonium cations present in the zeolite in its assynthesized form can be thermally decomposed to hydrogen cations and this form of the zeolite in turn can be ion exchanged to produce cation forms of zeolite Ω in which the organic cations can be other than tetramethylammonium or can be replaced with metal cations.

Some representative data on the adsorption of oxygen, nitrogen, water, carbon dioxide, isobutane, C$_8$F$_{16}$O and (C$_4$F$_9$)$_3$N by Ω zeolites are set forth in Table B below. These data show that Ω zeolites have a pore size of at least 11 A, as demonstrated by the adsorption of substantial quantities of (C$_4$F$_9$)$_3$N having a critical dimension of about 11.5 A. Thus the Ω zeolites are capable of adsorbing relatively large molecules such as benzene, cyclic compounds, etc.

TABLE B
ADSORPTION CHARACTERISTICS OF OMEGA ZEOLITES

| Adsorbate | Cation Form | Activation Temp., °C. | Temp., °C. | Press. mm. Hg | Wt-% Adsorbed |
|---|---|---|---|---|---|
| Oxygen | Na | 400 | −183 | 100 | 13.6 |
| Nitrogen | Na | 350 | −196 | 760 | 10.7 |
| Nitrogen | NH$_4$ | 250 | −196 | 760 | 13.2 |
| Water | Na | 200 | 25 | 18 | 21.3 |
| CO$_2$ | Na | 200 | −78 | 760 | 16.9 |
| i-C$_4$H$_{10}$ | Na | 200 | 25 | 760 | 4.4 |
| " | Ca | 400 | 25 | 760 | 4.8 |
| " | K | 400 | 25 | 760 | 5.9 |
| " | NH$_4$ | 400 | 25 | 760 | 5.0 |
| Neopentane | Na | 400 | 25 | 700 | 7.5 |
| C$_8$F$_{16}$O | Na | 350 | 29 | 30 | 23.0 |
| (C$_4$F$_9$)$_3$N | Na | 350 | 50 | 0.7 | 20.3* |
| " | Na | 400 | 50 | 0.7 | 16.9* |
| " | Ca | 400 | 50 | 0.7 | 15.0* |
| " | K | 400 | 50 | 0.7 | 17.4* |
| " | NH$_4$ | 250 | 50 | 0.7 | 15.6* |
| " | Na | 350 | 28 | 0.07 | 18.7* |
| " | Na | 400 | 28 | 0.07 | 13.0* |

*After 5 hours

Zeolite Ω may be prepared in decationized form by ion-exchange with ammonium or hydrogen cation followed by thermal treatment between about 350° C. and about 600° C. Such decationization process is disclosed for example in U.S. Pat. No. 3,130,006 to J. A. Rabo et al. issued Apr. 21, 1964.

The capabilities of zeolite Ω as a catalyst are exemplified by the following data. A sample of zeolite Ω having a SiO$_2$/Al$_2$O$_3$ molar ratio of 8.2 and containing tetramethylammonium and sodium cations was ammonium ion-exchanged and activated at 550° C. in air. A 10-gram portion of this decationized zeolite Ω was added to one gram-mol of benzene. Excess propylene was contacted with this slurry at room temperature, using magnetic stirring. A steady rise in temperature indicated that an exothermic alkylation reaction was taking place. A benzene conversion of 50.9% was obtained after one hour. This percentage conversion compares favorably with a value of 54.5% obtained under the same test conditions with a decationized Zeolite Y (U.S. Pat. No. 3,130,006 and 3,130,007; SiO$_2$/Al$_2$O$_3$ molar ratio=5.04). The various cation and decationized forms of zeolite Ω are similarly effective in the other hydrocarbon conversion processes commonly referred to as cracking, hydrocracking, isomerization, polymerization, hydrogenation, reforming and paraffin alkylation. Suitable reaction conditions for carrying out these processes are provided in U.S. Pat. No. 3,236,761 and 3,236,762 both issued to J. A. Rabo et al, Feb. 22, 1966 and incorporated herein by reference. In those processes where substantial hydrogenation activity is required, metals of Groups VI and VIII, particularly nickel, cobalt, chromium and the platinum group metals can be used in conjunction with the zeolite, the metal being carried either on or in the zeolite or on or in any inorganic oxide binder or matrix material such as silica or alumina which can also be employed in the conventional manner.

The following examples are provided for purposes of illustration and are intended to be in no way limitative of the proper scope of the invention as defined in the appended claims.

EXAMPLE I

A solution of sodium-tetramethylammonium aluminate was prepared by first dissolving 5.88 grams of alumina trihydrate in a solution made up of 16.8 grams of NaOH and about 10 cc of water, and then combining the resultant solution with a solution of 19.08 grams of $(CH_3)_4NOH.5H_2O$ is about 59 cc of water. This was blended with 150 grams of an aqueous colloidal silica sol containing 29.5 wt.-% silica. The resultant reaction mixture had an overall composition expressed in terms of mole of oxides as follows:

$$1.40[(CH_3)_4N]_2O.5.60Na_2O.Al_2O_3.20SiO_2.280H_2O$$

Crystallization was carried out by heating this reaction mixture in a Teflon-lined glass jar at a temperature of 100° C. for 64 hours. The crystalline product which formed was then separated from the mother liquor by filtration, washed with water and dried. X-ray analysis of a sample of the product revealed a powder diffraction pattern characteristic of zeolite Ω as shown below in Table C. Chemical analysis indicated a composition, expressed in terms of moles of the component oxides, corresponding to the formula:

$$0.36[(CH_3)_4N]_2O.0.71Na_2O.Al_2O_3.7.3SiO_2.6.3H_2O$$

The measured hydrated density of this product was 1.758 gm/cc.

TABLE C

| d,A | Intensity |
|---|---|
| 15.95 | 20 |
| 9.09 | 86 |
| 7.87 | 21 |
| 6.86 | 27 |
| 5.94 | 32 |
| 5.47 | 6 |
| 5.25 } 5.19 | 8 |
| 4.695 | 32 |
| 3.909 | 11 |
| 3.794 | 58 |
| 3.708 | 30 |
| 3.620 | 25 |
| 3.516 | 53 |
| 3.456 | 20 |
| 3.13 | 38 |
| 3.074 } 3.02 | 21 |
| 2.911 | 36 |
| 2.640 | 6 |
| 2.488 | 6 |
| 2.342 | 17 |
| 2.272 | 6 |
| 2.139 | 5 |
| 2.031 | 17 |
| 1.978 | 5 |
| 1.909 | 10 |
| 1.748 | 6 |

EXAMPLE 2

In a procedure similar to that of Example 1 above the following starting materials (weights in grams) were used:
Alumina trihydrate: 17.64
NaOH: 50.40
$N(CH_3)_4OH.5H_2O$: 57.24
Aqueous colloidal silica sol: 450
Water: 206

The resultant reactant mixture had the following composition:

$$1.40[(CH_3)_4N]_2O.5.60Na_2O.Al_2O_3.20SiO_2.280H_2O$$

Duration of the reaction at 100° C. was 65 hours. X-ray analysis of the product revealed a powder diffraction pattern characteristic of zeolite Ω. Chemical analysis showed a composition corresponding to the formula $$0.30[(CH_3)_4N]_2O.0.79Na_2O.Al_2O_3.7.52SiO_2.6.8H_2O$$

EXAMPLE 3

In a procedure like that of Example 1 above, the following starting materials (weights in grams) were used:
Alumina trihydrate: 3.9
NaOH: 6.4
$N(CH_3)_4OH.5H_2O$: 7.25
Aqueous colloidal silica sol: 50
Water: 30.5

The resultant reactant mixture had the following composition:

$$0.80[(CH_3)_4N]_2O.3.2Na_2O.Al_2O_3.10SiO_2.160H_2O$$

Duration of the reaction at 100° C. was 47 hours. X-ray analysis of the product revealed a powder diffraction pattern characteristic of zeolite Ω.

EXAMPLE 4

A 1 molar solution of $LaCl_3$ was prepared by dissolving 4.0 grams of $LaCl_3.7H_2O$ in 15 ml. of distilled water. A sample of zeolite Ω weighing 5.0 grams and containing sodium and tetramethylammonium cations was contacted with 75 ml. of the exchanging solution in two separate exchanges. Chemical analysis of the exchanged zeolite Ω showed the following molar composition:

$$0.35Na_2O.0.167La_2O_3.0.25[(CH_3)_4N]_2O.1.00Al_2O_3.7.45SiO_2.6.3H_2O,$$

corresponding to 45% $La^{+3}$ exchange based on the number of cation equivalents per atom of aluminum.

EXAMPLE 5

Using a procedure similar to that of Example 1 above, a reactant mixture was prepared from alumina, NaOH, $N(CH_3)_4OH.5H_2O$, aqueous colloidal silica sol and water. The overall composition of this mixture, in terms of moles of oxides, was:

$$1.4[(CH_3)_4N]_2O.5.6Na_2O.Al_2O_3.20SiO_2.280H_2O.$$

A reaction temperature of 100° C. was maintained for 68 hours. The molar composition of the product, identified by X-ray powder diffraction as zeolite Ω was:

$$0.33[(CH_3)_4N]_2O.0.86Na_2O.Al_2O_3.8.24SiO_2.6.7H_2O.$$

EXAMPLE 6

Using a procedure similar to that of the preceding synthesis examples, zeolite Ω was crystallized at 100° C. (168 hrs.) from an aqueous reactant mixture of the following molar composition:

1.4[(CH₃)₄N]₂O.5.6Na₂O.Al₂O₃.17.5SiO₂.220H₂O.

The source of Al₂O₃ was AlCl₃. The above mixture also contained 1.0 mole P₂O₅ mole of Al₂O₃. The zeolite Ω product had the following molar composition:

0.61[(CH₃)₄N]₂O.0.82Na₂O.Al₂O₃.10.4SiO₂.6.48-H₂O.

EXAMPLE 7

Using a procedure similar to that of Example 1 above, zeolite Ω was produced at 100° C. (140 hours) from an aqueous reactant mixture of the following molar composition:

1.0[CH₃)₄N]₂O.4.0Na₂O.Al₂O₃.10SiO₂.400H₂O.

The source of Al₂O₃ was Al(OH)₃. X-ray analysis of the product revealed a powder diffraction pattern characteristic of zeolite Ω.

EXAMPLE 8

Using a procedure similar to that of Example 1 above, a reactant mixture was prepared from Al(OH)₃, NaOH, N(CH₃)₄OH.5H₂O, aqueous colloidal silica sol and water. The overall composition of this mixture, in terms of moles of oxides, was:

0.4[(CH₃)₄N]₂O.1.6Na₂O.Al₂O₃.10SiO₂.100H₂O.

A reaction temperature of 100° C. was maintained for 855 hours. X-ray analysis of a sample of the product showed a powder diffraction pattern characteristic of zeolite Ω. Chemical analysis of the product showed the following molar composition:

0.33[(CH₃)₄N]₂O.0.77Na₂O.Al₂O₃.9.21SiO₂.6.0-H₂O.

After vacuum activation at 350° C. a sample of the product was found to adsorb 10.2 wt.-% O₂ at 100 mm, −183° C.

EXAMPLE 9

Using a procedure similar to that of Example 1 above, a reactant mixture was prepared from Al(OH)₃, NaOH, N(CH₃)₄OH.5H₂O, Hi-Sil-233 silica, and water. The solution of sodium-tertramethylammonium aluminate was blended with a water paste or slurry of the Hi-Sil-233 silica. The overall composition of the mixture, in terms of moles of oxides, was:

0.21[(CH₃)₄N]₂O.1.91Na₂O.Al₂O₃.7.5SiO₂.88H₂O.

A reaction temperature of 100° C. was maintained for 117 hours. X-ray analysis of a sample of the product showed a powder diffraction pattern characteristic of zeolite Ω. Chemical analysis of the product showed the following molar composition:

0.18[(CH₃)₄N]₂O.0.75Na₂O.Al₂O₃.5.49SiO₂.5.2-H₂O.

After vacuum activation at 410° C. a sample of the product was found to adsorb 12.6 wt.-% O₂ at 100 mm, −183° C.

EXAMPLE 10

Using a procedure similar to Example 9 above, a reactant mixture was prepared from Al(OH)₃, NaOH, N(CH₃)₄OH.5H₂O, Hi-Sil-233 silica, and water. The overall composition of the mixture, in terms of moles of oxides, was:

0.13[(CH₃)₄N]₂O.1.99Na₂O.Al₂O₃.10SiO₂.88H₂O.

A portion of this reactant mixture was heated at a reaction temperature of 125° C. at autogenous pressure for 122 hours. X-ray analysis of a sample of the product showed a powder diffraction pattern characteristic of zeolite Ω. Chemical analysis of the product showed the following molar composition:

0.11[(CH₃)₄N]₂O.0.89Na₂O.Al₂O₃.7.90SiO₂.5.9H₂O.

After vacuum activation at 406° C., a sample of the product was found to adsorb 13.6 wt.-% O₂ at 100 mm, −183° C.

A second portion of the reactant mixture was heated at a reaction temperature of 175° C. at autogenous pressure for 122 hours. X-ray analysis of a sample of the product showed a powder diffraction pattern characteristic of zeolite Ω. A sample of the product was found to adsorb 12.2 wt.-% O₂ at 100 mm, −183° C., after vacuum activation at 406° C.

EXAMPLE 11

Using a procedure similar to Example 9 above, a reactant mixture was prepared from Al(OH)₃, NaOH, N(CH₃)₄OH.5H₂O. HiSil-233 silica, and water. The overall composition of the mixture, in terms of moles of oxides, was:

0.04[(CH₃)₄N]₂O.2.16Na₂O.Al₂O₃.10SiO₂.128H₂O.

A reaction temperature of 175° C. at autogenous pressure was maintained for 49 hours. X-ray analysis of a sample of the product showed a powder diffraction pattern characteristic of zeolite Ω, containing a trace of a crystalline impurity.

EXAMPLE 12

Using a procedure similar to Example 9 above, a reactant mixture was prepared from Al(OH)₃, NaOH, N(CH₃)₄OH.5H₂O, Hi Sil-233 silica and water. The overall composition of the mixture in terms of moles of oxides, was:

0.6[(CH₃)₄N]₂O.2.4Na₂O.Al₂O₃.10SiO₂.150H₂O.

A reaction temperature of 120° C. at autogenous pressure was maintained for 24 hours. X-ray analysis of a sample of the product showed a powder diffraction pattern characteristic of zeolite Ω. Chemical analysis of the product showed the following molar composition:

0.26[(CH₃)₄N]₂O.0.73Na₂O.Al₂O₃.6.63SiO₂.4.9-H₂O.

After vacuum activation at 414° C. a sample of the product was found to adsorb 10.9 wt.-% O₂ at 100 mm. −183° C.

EXAMPLE 13

Using a procedure similar to Example 9 above, a reactant mixture was prepared from Al(OH)$_3$, NaOH, N(CH$_3$)$_4$OH.5H$_2$O, HiSil-233 silica and water. The overall composition of the mixture, in terms of oxides, was:

$$0.09[(CH_3)_4N]_2O \cdot 2.15Na_2O \cdot Al_2O_3 \cdot 10SiO_2 \cdot 69.5H_2O.$$

A reaction temperature of 100° C. was maintained for 528 hours. X-ray analysis of a sample of the product showed a powder diffraction characteristic of zeolite Ω. Chemical analysis of the product showed the following molar composition:

$$0.12[(CH_3)_4N]_2O \cdot 0.94Na_2O \cdot Al_2O_3 \cdot 6.97SiO_2 \cdot 5.9H_2O.$$

After vacuum activation at 412° C., a sample of the product was found to adsorb 10.1 wt.-% O$_2$ at 100 mm, −183° C.

What is claimed is:

1. A crystalline synthetic zeolitic molecular sieve having a composition expressed in terms of moles of oxides as $$1.0 \pm 0.5 M_{2/n}O : Al_2O_3 : 5\text{-}20SiO_2 : 0\text{-}10H_2O$$

wherein M represents at least one action having a valence "n", and having an x-ray powder diffraction pattern essentially as set forth in Table A.

2. Composition according to claim 1 wherein "n" has a value of from 1 to 3 inclusive.

3. A crystalline synthetic zeolitic molecular sieve having a composition expressed in terms of moles of oxides as follows:

$$[xR_2O + yM_{2/n}O] : Al_2O_3 : zSiO_2 : aH_2O,$$

wherein R represents hydrogen, ammonium, alkylammonium or mixtures thereof, x has a value of from about 0 to about 0.7, m represents at least one alkali metal, alkaline earth metal, transition metal or rare earth element of the lanthanide series, n is the valence of M, y has a value of from about 0.5 to about 1.5, the sum of x and y being from about 0.5 to about 1.5, z represents the number of moles of SiO$_2$ and has a value of from about 5 to about 20, and a has a value of from about zero to about 10, said zeolitic molecular sieve having an x-ray powder diffraction pattern essentially as set forth in Table A.

4. The crystalline zeolitic molecular sieve of claim 3 wherein R is tetramethylammonium and M is sodium.

5. A porous crystalline synthetic zeolitic molecular sieve aluminosilicate having uniform pore diameters of at least 11 Angstroms, and aluminosilicate containing at least some structural tetramethylammonium cations and having an x-ray powder diffraction pattern characterized by at least those interplanar spacing values set forth in Table A.

6. A crystalline synthetic zeolitic molecular sieve having a composition expressed in terms of oxides as $$1.0 \pm 0.5 M_{2/n} : Al_2O_3 : 5\text{-}12SiO_2 : 0\text{-}10H_2O.$$

wherein M represents at least one cation having a valence of "n" and having an x-ray powder diffraction pattern essentially as set forth in Table A.

* * * * *